June 20, 1950     J. METZ     2,512,033
REPLACEMENT TANG
Filed Dec. 21, 1944
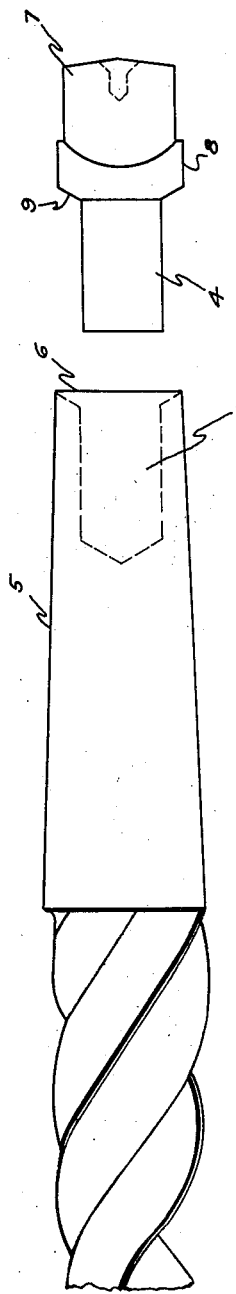
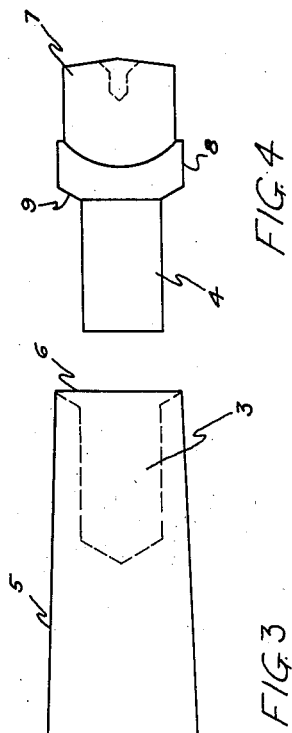
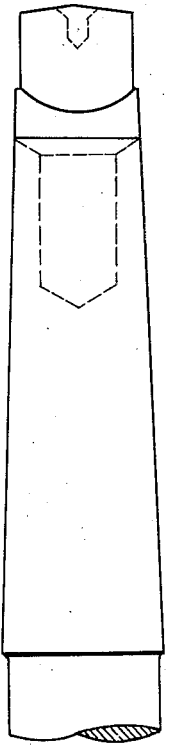
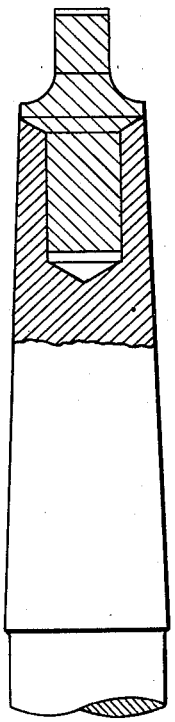
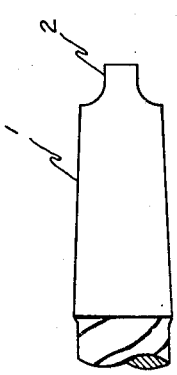
INVENTOR.
James Metz
BY Allen & Allen
Attorneys

UNITED STATES PATENT OFFICE 2,512,033

REPLACEMENT TANG

James Metz, Mount Healthy, Ohio, assignor to Nu-Tangs Inc., Cincinnati, Ohio, a corporation of Ohio Application December 21, 1944, Serial No. 569,211

1 Claim. (Cl. 77—71)

My invention relates to replaceable tangs for drill shanks or the like.

In the usual type of high speed drill the shank is tapered and terminates in a projecting tang. The chuck for holding the drill has a tapered interior which frictionally holds the shank of the drill in position while the drill is being operated. The tang of the drill shank projects upwardly in a slot in the chuck and under normal operation carries very little or no load. However, if the tapered shank should slip in the chuck, the tang contacts the slot and prevents the drill from turning in the chuck and ruining the interior tapered surface of the chuck. Due to the fact that the tang is relatively small, it is very apt to break in the chuck, which necessitates discarding an otherwise good drill, welding on a new tang with its accompanying expense and loss of time, or turning down the old drill shank to form a new tang which, of course, results in a smaller taper.

It is an object of my invention to provide a drill shank having a removable or replaceable tang so that when the tang is broken it may be easily and quickly replaced by a new tang, thus greatly lengthening the life of the drill and eliminating the necessity of reducing the shank.

While in the following description and the drawings, I will describe my replaceable tang for use with a drill, carrying a shank having a Morse taper, it is to be understood that my replaceable tang may be used on other machine tools having a tang such as reamers, fly cutting bars, etc.

These and other objects of my invention which will be set forth hereinafter or will be apparent to one skilled in the art upon reading these specifications, I accomplish by that certain construction and arrangement of parts of which I shall now describe an exemplary embodiment.

Reference is now made to the drawings which form a part hereof and in which:

Figure 1 is a side elevation of a drill shank with my tang in place.

Figure 2 is a side elevation taken at right angles to that shown in Figure 1, and with a portion cut away to show my replaceable tang in place.

Figure 3 is a side elevation of a shank without the replaceable tang.

Figure 4 is a side elevation of the replaceable tang which when combined with Figure 3 results in Figures 1 and 2.

Figure 5 is a side elevation of the usual type of Morse tapered drill shank and tang.

Referring to Figure 5, the usual type of taper drill shank is indicated at 1 with the projecting tang at 2. It is the portion 2 which is snapped off or broken frequently when the drill slips in the chuck. In the practice of my invention I provide a drill shank 5 such as shown in Figure 3, and which has the usual Morse taper indicated in Figure 5. The shank 5 terminates in the shoulder 6 and has drilled in the end, the socket 3. Preferably the shoulder 6 is beveled as may be seen in Figure 3, the bevel being approximately a 30° angle.

My replaceable tang is shown in Figure 4 and consists of the usual tang portion 7 projecting from a collar portion 8. A plug portion 4 of slightly smaller diameter than the diameter of the socket 3 of the shank projects from the collar 8. The shoulder 9 of the collar 8 is preferably beveled to a similar degree as the shoulder 6.

The completed shank and tang is formed by inserting the projection or plug 4 into the socket 3, the two being bound together by the use of silver solder.

In placing the two together it has been found preferable to insert the projection 4 into the socket 3; place a ring of solid silver solder between the two bevels 6 and 9, and then to heat both the shank and the tang. The silver solder by reason of the bevels will thus flow when melted between the plug portion 4 and the socket 3, and completely bind the two together.

When the tang 7 breaks when the drill is being used in the chuck, the remaining portion of the drill is removed, the shank portion 5 heated, and the plug 4 with the broken tang 7 removed. A new tang portion as shown in Figure 4 is then inserted and silver soldered in place as described above.

From the above it is apparent that the original drill end shank may be used over and over again if the tangs are broken by merely replacing the portion shown in Figure 4.

From the above it is apparent that tang portions as shown in Figure 4, for different sized shanks may be kept in stock and a broken tang may be easily and quickly replaced.

It is to be understood that modifications may be made in my invention without departing from the spirit thereof, and that I do not intend to limit myself otherwise than as pointed out in the claim which follows.

Having thus described my invention, what I claim as new and desire to secure by Letters Patent is:

In a cutting tool of that class which, in their normal function are subjected to torsional strains, said tool having a shank element and a separate tang element, a joint between said elements comprising a smooth uninterrupted cylindrical stud on one of said elements, said stud having a beveled shoulder, and a smooth uninterrupted cylindrical bore in the other of said elements, said bore having a chamfered edge to match said beveled shoulder, said stud being secured in said bore by solder, whereby up breakage of said tang element, the broken tang element can be separated from said shank element by melting said solder, and replaced by a duplicate tang element, so that said tool is again usable, without reducing the combined length of said shank and tang elements.

JAMES METZ.

REFERENCES CITED

The following references are of record in the file of this patent:

UNITED STATES PATENTS

| Number | Name | Date |
|---|---|---|
| 724,520 | Taylor | Apr. 7, 1903 |
| 837,322 | Miller | Dec. 4, 1906 |
| 1,191,717 | Moore | July 18, 1916 |
| 1,457,499 | Coffey | June 5, 1923 |
| 1,951,122 | Balze | Mar. 13, 1934 |
| 2,174,218 | Greene | Sept. 26, 1939 |
| 2,356,835 | Duckett | Aug. 29, 1944 |

FOREIGN PATENTS

| Number | Country | Date |
|---|---|---|
| 202,513 | Canada | Aug. 3, 1920 |

OTHER REFERENCES

"American Machinist," vol. 39, No. 17, p. 706, Oct. 23, 1913, article: "Repairing Broken Tangs."